(12) United States Patent
Zhou et al.

(10) Patent No.: US 8,145,282 B2
(45) Date of Patent: Mar. 27, 2012

(54) ROTATING MECHANISM FOR PORTABLE ELECTRONIC DEVICE

(75) Inventors: Xin-Quan Zhou, Shenzhen (CN); Hsiao-Hua Tu, Taipei (TW); Ye Liu, Shenzhen (CN); Gang Yang, Shenzhen (CN); Jun Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 242 days.

(21) Appl. No.: 12/581,267

(22) Filed: Oct. 19, 2009

(65) Prior Publication Data
US 2010/0172071 A1    Jul. 8, 2010

(30) Foreign Application Priority Data
Jan. 8, 2009   (CN) .......................... 2009 1 0300122

(51) Int. Cl.
*H04M 1/00* (2006.01)

(52) U.S. Cl. ............... 455/575.1; 455/575.3; 455/575.4; 361/679.01; 361/679.06; 361/679.21

(58) Field of Classification Search .................. 455/566, 455/90, 575.1–575.9; 361/679.01–679.09, 361/679.1, 679.12, 679.16, 679.21, 679.26–679.29, 361/679.3; D14/138 R–138 G
See application file for complete search history.

(56) References Cited

U.S. PATENT DOCUMENTS

| | | | |
|---|---|---|---|
| 6,430,038 B1* | 8/2002 | Helot et al. ............. | 361/679.05 |
| 2004/0246665 A1* | 12/2004 | Cheng et al. ................. | 361/683 |
| 2005/0124392 A1* | 6/2005 | Jeong .......................... | 455/575.1 |
| 2006/0064849 A1* | 3/2006 | Liu et al. ......................... | 16/307 |
| 2007/0036350 A1* | 2/2007 | Duan et al. ................ | 379/433.13 |
| 2009/0061959 A1* | 3/2009 | Cheng et al. .............. | 455/575.3 |
| 2009/0221333 A1* | 9/2009 | Harvey ...................... | 455/575.1 |

\* cited by examiner

*Primary Examiner* — Marivelisse Santiago Cordero
*Assistant Examiner* — Dung Hong
(74) *Attorney, Agent, or Firm* — Altis Law Group, Inc.

(57) ABSTRACT

A rotating mechanism is used for a portable electronic device including a housing body and a display. The rotating mechanism includes a primary plate, a subsidiary plate and the connecting plate. The primary plate is pivotally connected to the housing body. The subsidiary plate is pivotally connected to the primary plate. The connecting plate is rotatably connected to the subsidiary plate. The connecting plate is fixed to the display allowing the display to hold a variety of positions relative to the housing body.

10 Claims, 10 Drawing Sheets

ROTATING MECHANISM FOR PORTABLE ELECTRONIC DEVICE

BACKGROUND

1. Technical Field

The present disclosure relates to rotating mechanisms, and more particularly to a rotating mechanism for a portable electronic device (e.g., mobile phones).

2. Description of Related Art

A conventional mobile phone includes a phone body and a cover. The phone body and the cover are rotatably connected together by a hinge. The cover includes a display facing the phone body. During functioning of the phone, alphabet, numbers, and images are shown on the display when a user opens the cover from the phone body by pivoting. However, since the mobile phone can only be opened to preset angles, the display cannot realize wider angles of adjustment relative to the phone body.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present rotating mechanism for portable electronic device. Moreover, in the drawings, like reference numerals designate corresponding parts throughout the several views, in which.

DETAILED DESCRIPTION

Figure 1:
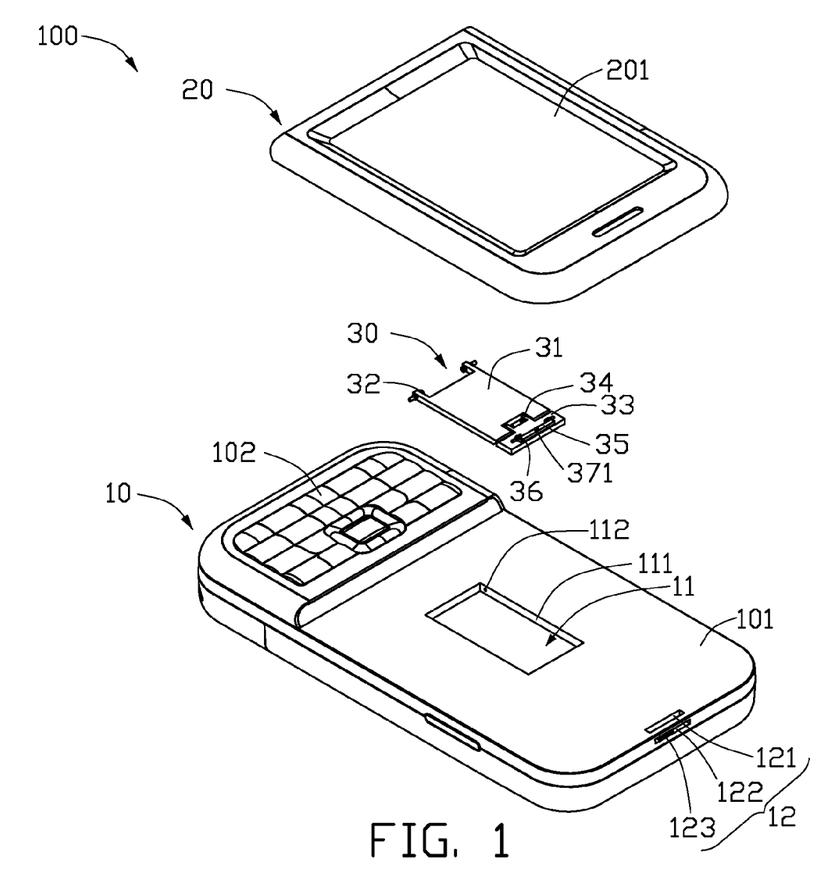
FIG. 1 is an exploded, isometric view of an exemplary rotating mechanism used for portable electronic device.

FIG. 1 shows an exemplary embodiment of a rotating mechanism 30 used to a portable electronic device 100, such as a mobile phone.

The mobile phone 100 includes a housing body 10 and a display 20. The display 20 is attached to the housing body 10. The housing body 10 includes a supporting portion 101 and a keypad 102. The supporting portion 101 defines a rectangular cavity 11 with two sidewalls 111. Each sidewall 111 defines a pin hole 112 at one end thereof. One end of the supporting portion 101 forms a latching portion 12 for releasable latching the display 20. The latching portion 12 includes a slot 121, and a latching hole 122 respectively defined two substantially perpendicular surfaces. A block 123 is slidably received in the latching hole 122.

Figure 2:
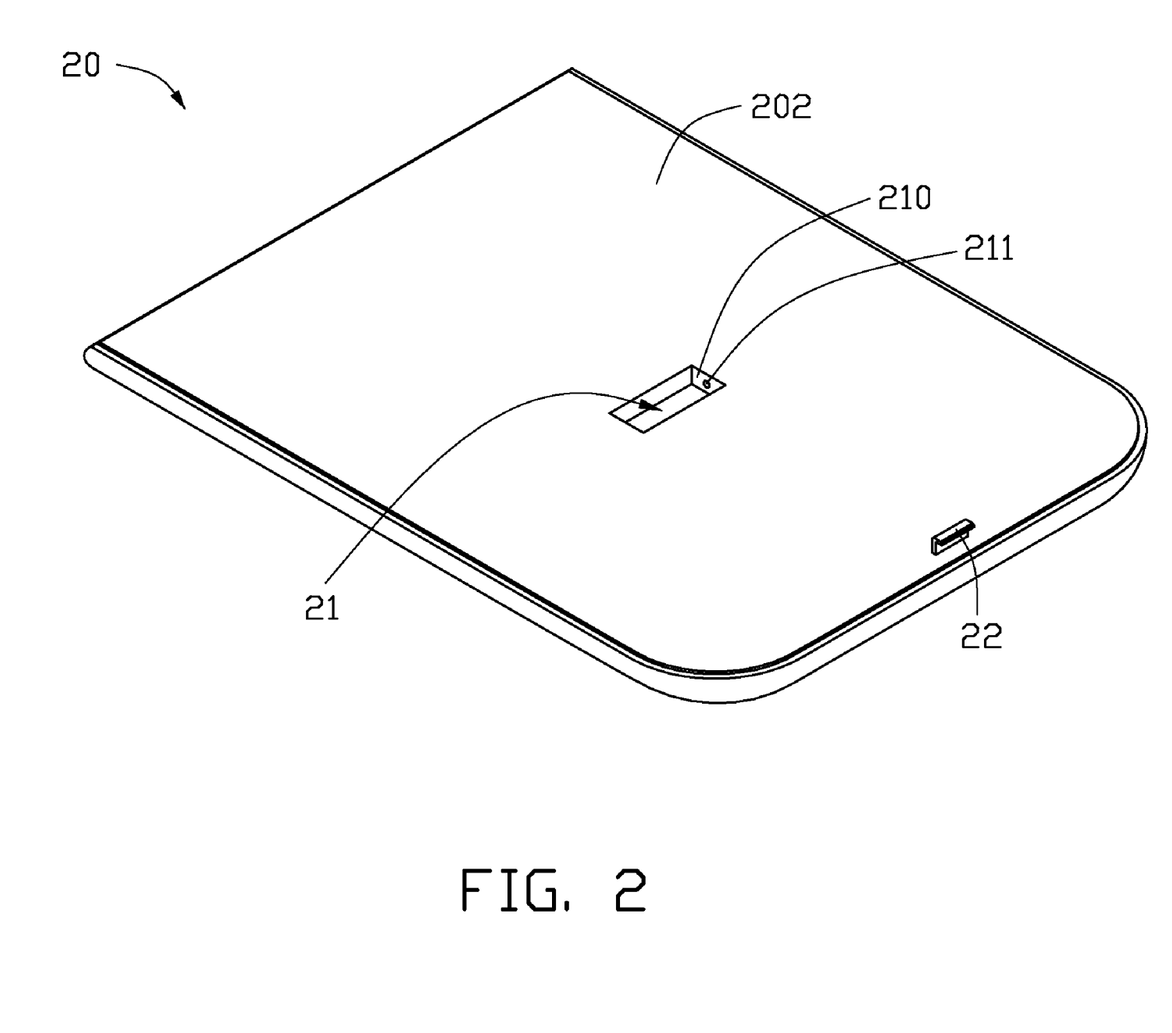
FIG. 2 is an isometric view of the display shown in FIG. 1, but viewed from another aspect.

The display 20 includes a screen 201 and an inner surface 202. The inner surface 202 defines a recess 21 at a middle portion thereof and a hook 22 at an end thereof. The recess 21 corresponds to the cavity 11 and includes two end walls 210. Each end wall 210 defines a latching hole 211. Each hook 22 is substantially L-shape, and is used for latching the block 123 of the housing body 10.

Figure 3:
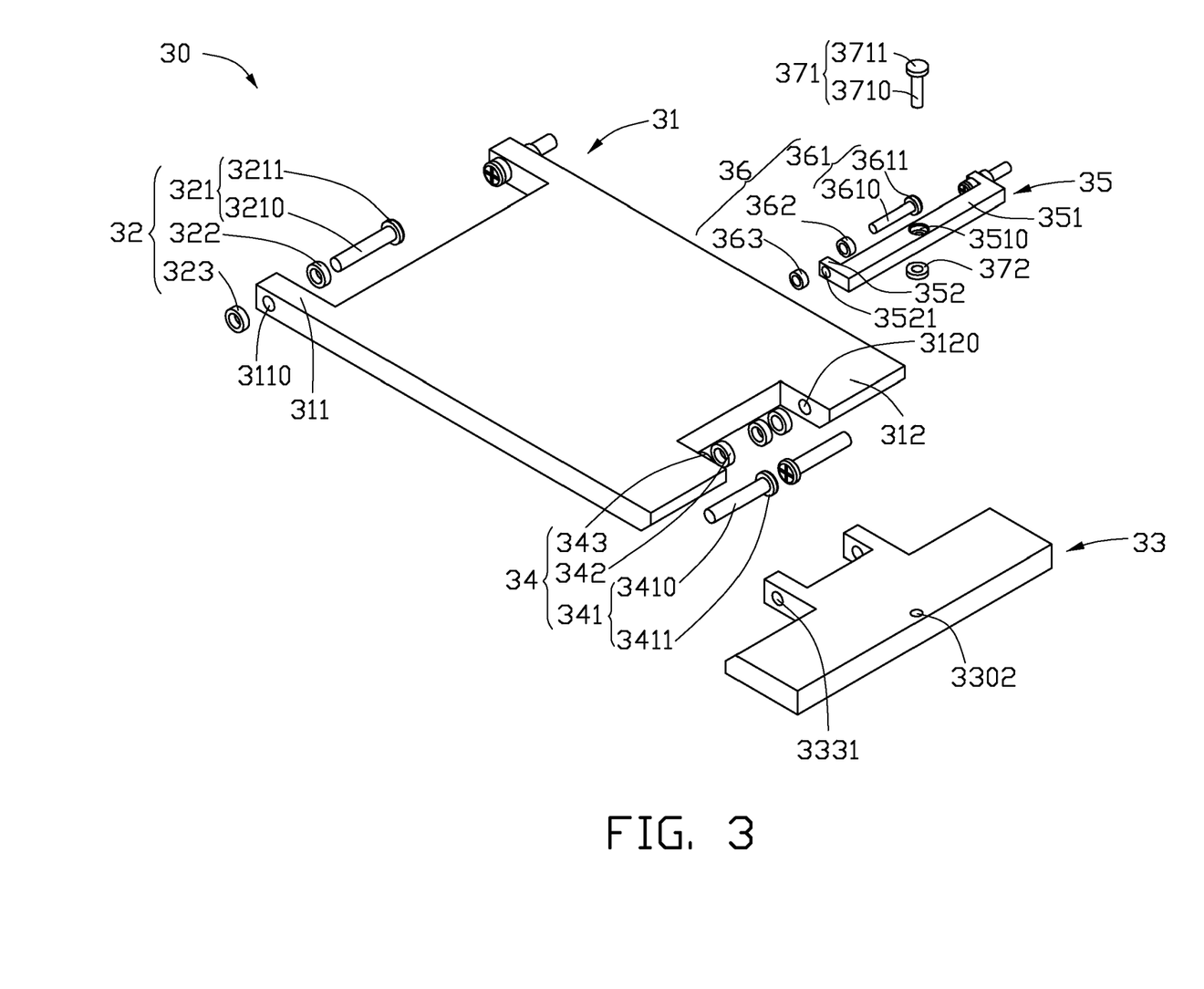
FIG. 3 is an enlarged view of the rotating mechanism shown in FIG. 1.

Referring to FIG. 3, the rotating mechanism 30 includes a primary plate 31, a subsidiary plate 33 and a connecting plate 35. One end of the primary plate 31 forms two opposite arm portions 311 extending from two sides thereof. Each arm portion 311 defines a rod hole 3110 corresponding to the pin hole 112. Two first hinge assemblies 32 are used for rotatably connecting the primary plate 31 to the housing body 10. Each first hinge assembly includes a rod 321 and two washers 322, 323. Each rod 321 includes a rod portion 3210 and a head portion 3211. The washers 322, 323 are made of elastic material such as rubber or nylon. Each rod 321 passes through the rod hole 3110, and is pivotally connected to the pin hole 112. The two washers 322, 323 are respectively positioned at two sides of each arm portion 311, and are placed around the rod portion 3210 for providing friction to allow the primary plate 31 to be held at any angle relative to the housing body 10. The other end of the primary plate 31 forms two knuckle portions 312. Each knuckle portion 312 defines a shaft hole 3120.

Figure 4:
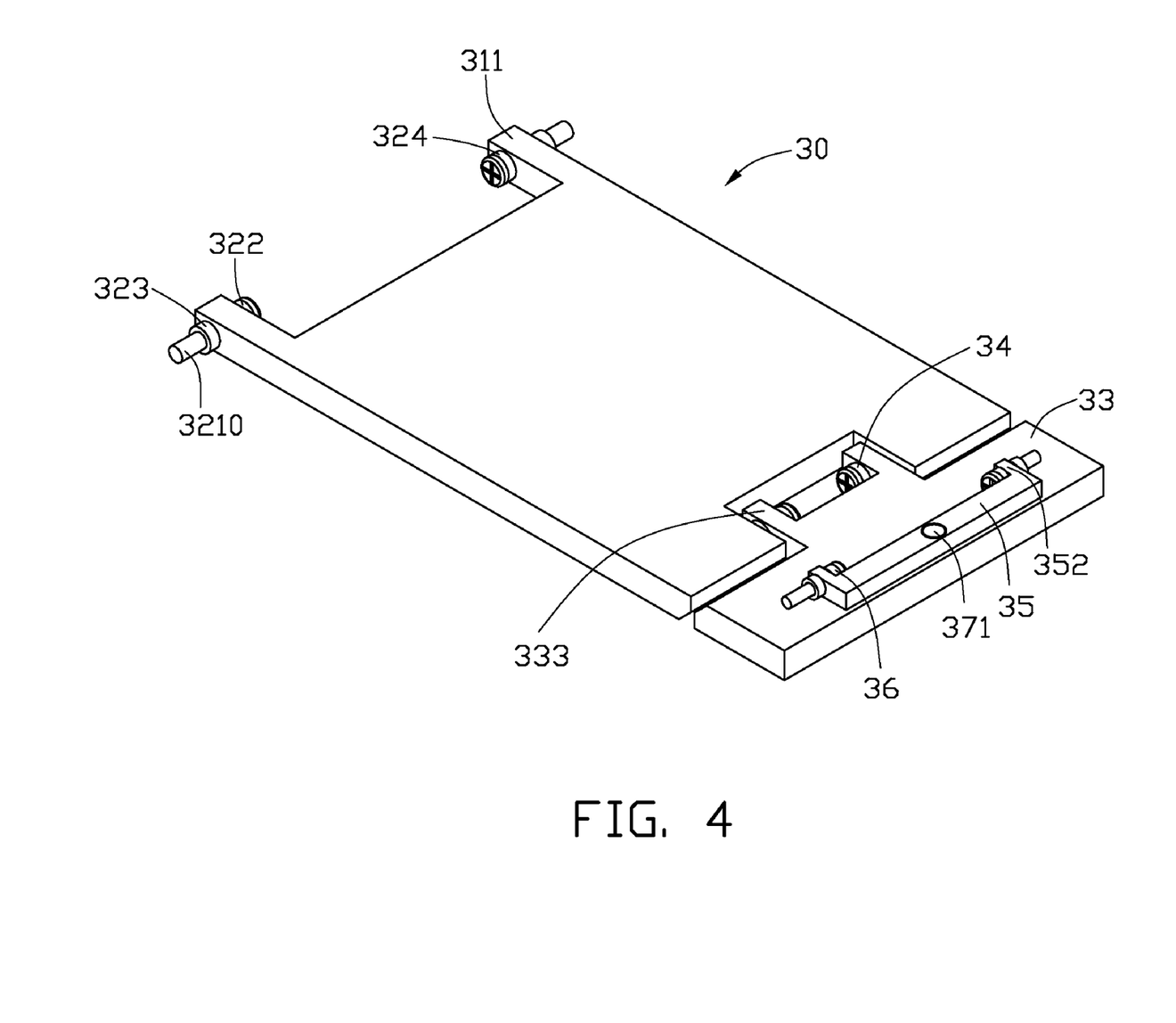
FIG. 4 is an exploded, isometric view of the rotating mechanism shown in FIG. 3.

The subsidiary plate 33 forms two opposite extending portions 333 for being positioned between the knuckle portions 312. Each extending portion 333 longitudinally defines a connecting hole 3331 corresponding to the shaft hole 3120. The subsidiary plate 33 traversely defines a circular notch 3302 away from the extending portions 333. Two second hinge assemblies 34 are used for connecting the subsidiary plate 33 to the primary plate 31. Each second hinge assembly 34 is similar to each first hinge assembly 32, also includes a rod 341 and two washers 342, 343. Each rod 341 includes a rod portion 3410 and a head portion 3411. The washers 342, 343 are made of elastic material such as rubber or nylon. Each rod 341 passes through the washer 342, the shaft hole 3120, the washer 343, and the connecting hole 3331, in the order written, for pivotally connecting the subsidiary plate 33 to the primary plate 31. The two washers 342, 343 are respectively positioned between the extending portion 333 and the knuckle portions 312 for providing friction to allow the subsidiary plate 33 to be held at any angle relative to the primary plate 31.

The connecting plate 35 is narrow, substantially rectangular, and has a size that corresponds to the recess 210. The connecting plate 35 forms two opposite pivotal portions 352 extending at two sides thereof. Each pivotal portion 352 longitudinally defines a pivotal hole 3521. Two third hinge assemblies 36 are fixedly connected the connecting plate 35 to the display 20. Each third hinge assembly 36 is similar to each second hinge assembly 34, and includes a rod 361 and two washers 362, 363. Each rod 361 includes a rod portion 3610 and a head portion 3611. The washers 362, 363 are made of elastic material such as rubber. Each rod 361 passes through the pivotal hole 3521, and is fixedly connected to the latching hole 211 for connecting the connecting plate 35 to the display 20. The connecting plate 35 traversely defines a stepped hole 3510 at a middle thereof. A pin 371 and a washer 372 are used for connecting the stepped hole 3510 and the notch 3302 allowing the connecting plate 35 to pivotally connect the subsidiary plate 33. The pin 371 includes a flange portion 3711 and a pin portion 3710.

Figure 5:
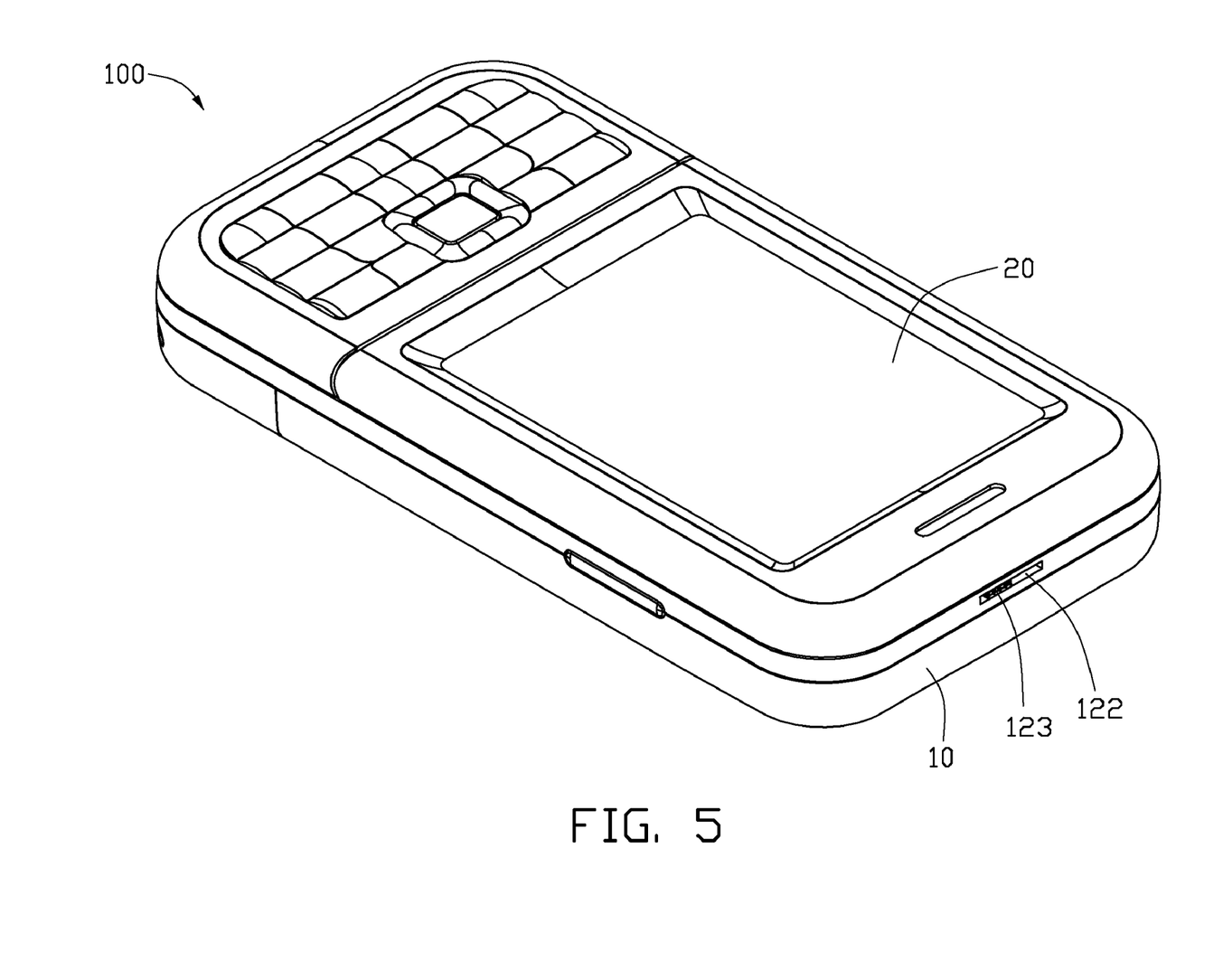
FIG. 5 is an assembled, isometric view of the exemplary mobile phone shown in FIG. 1.
Figure 6:
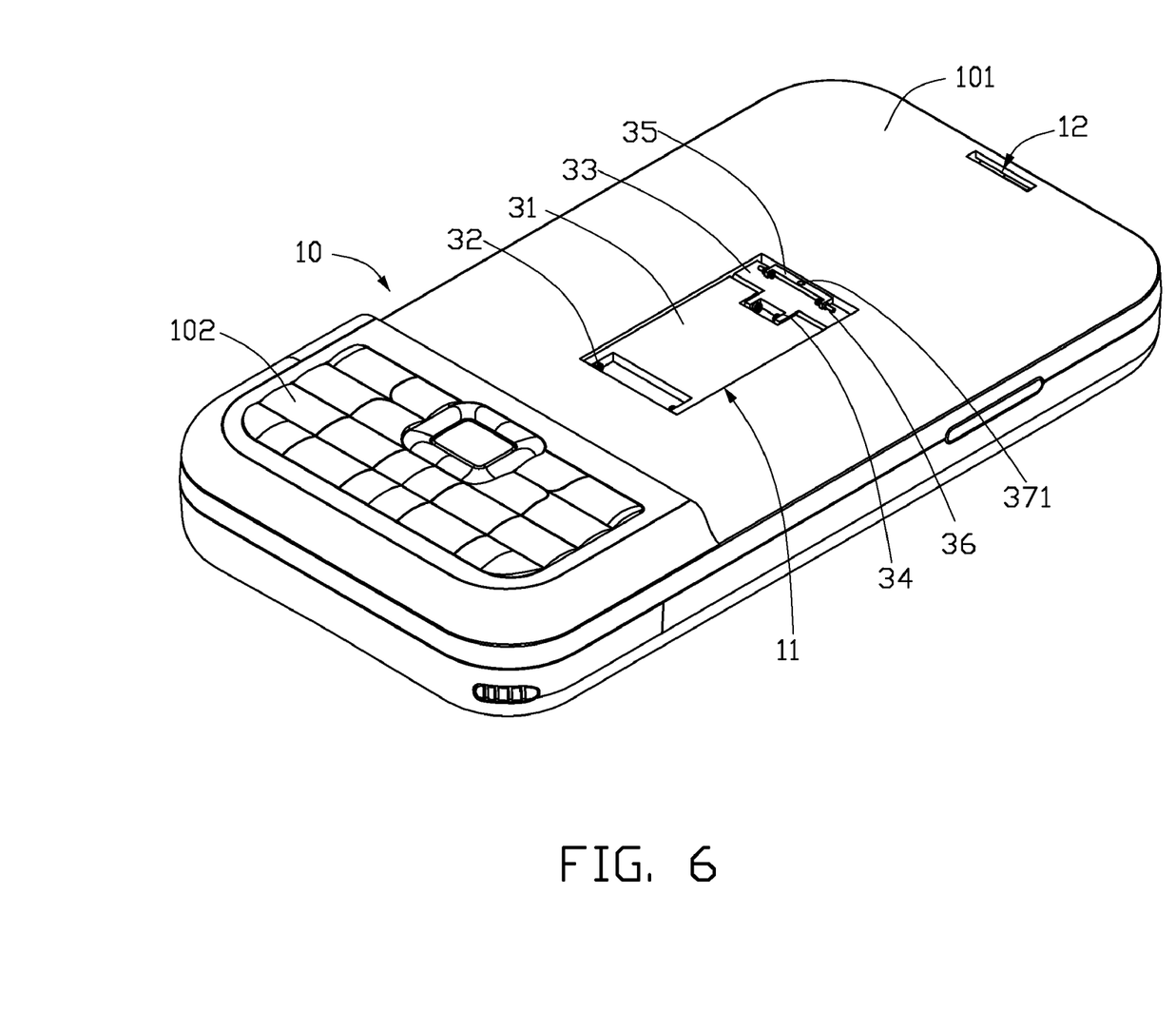
FIG. 6 is a partially assembled view of the mobile phone shown in FIG. 1.
Figure 7:
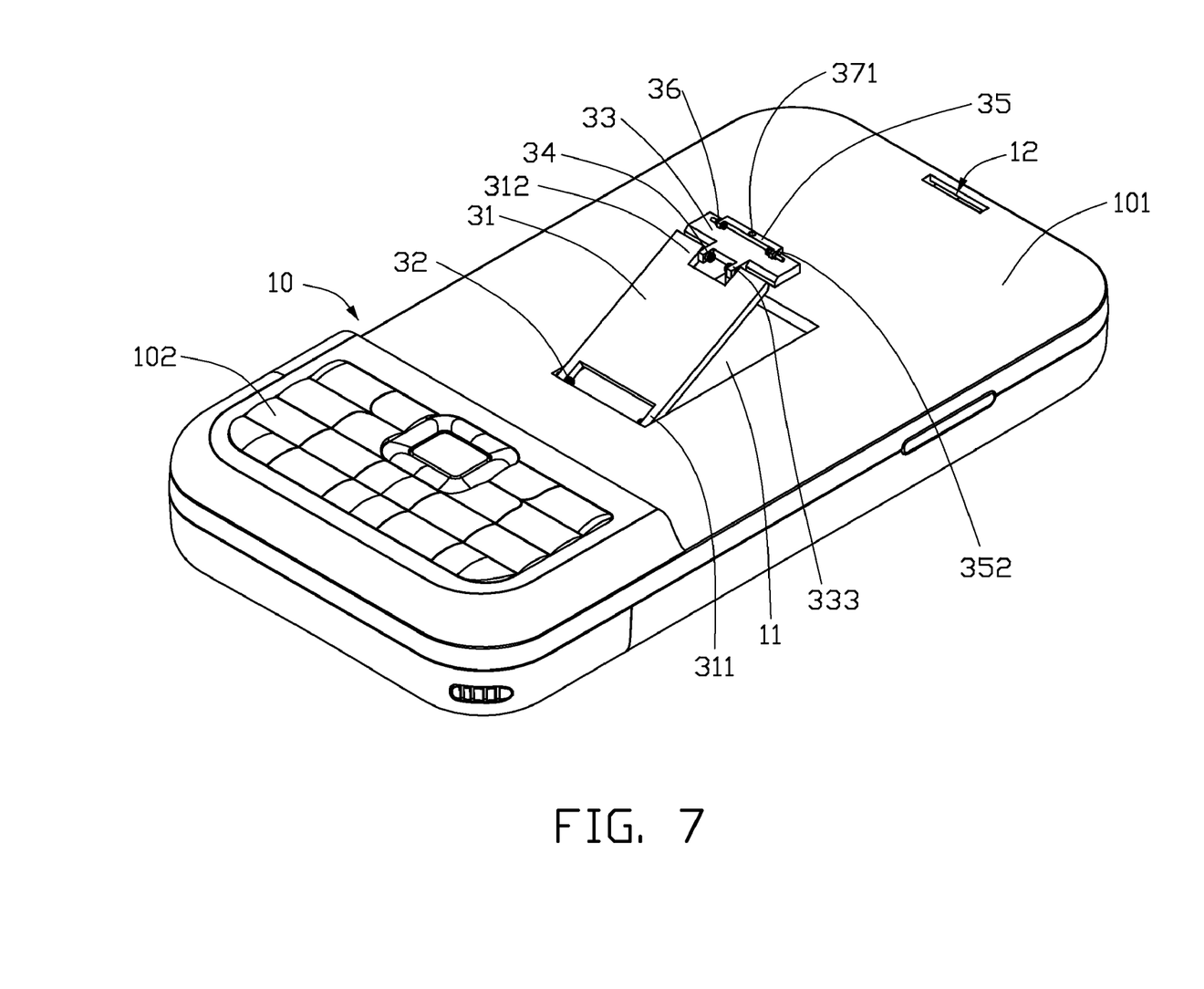
FIGS. 7 to 9 are sequential views of the rotating mechanism of FIG. 6 showing the rotating mechanism at different positions.
Figure 8:
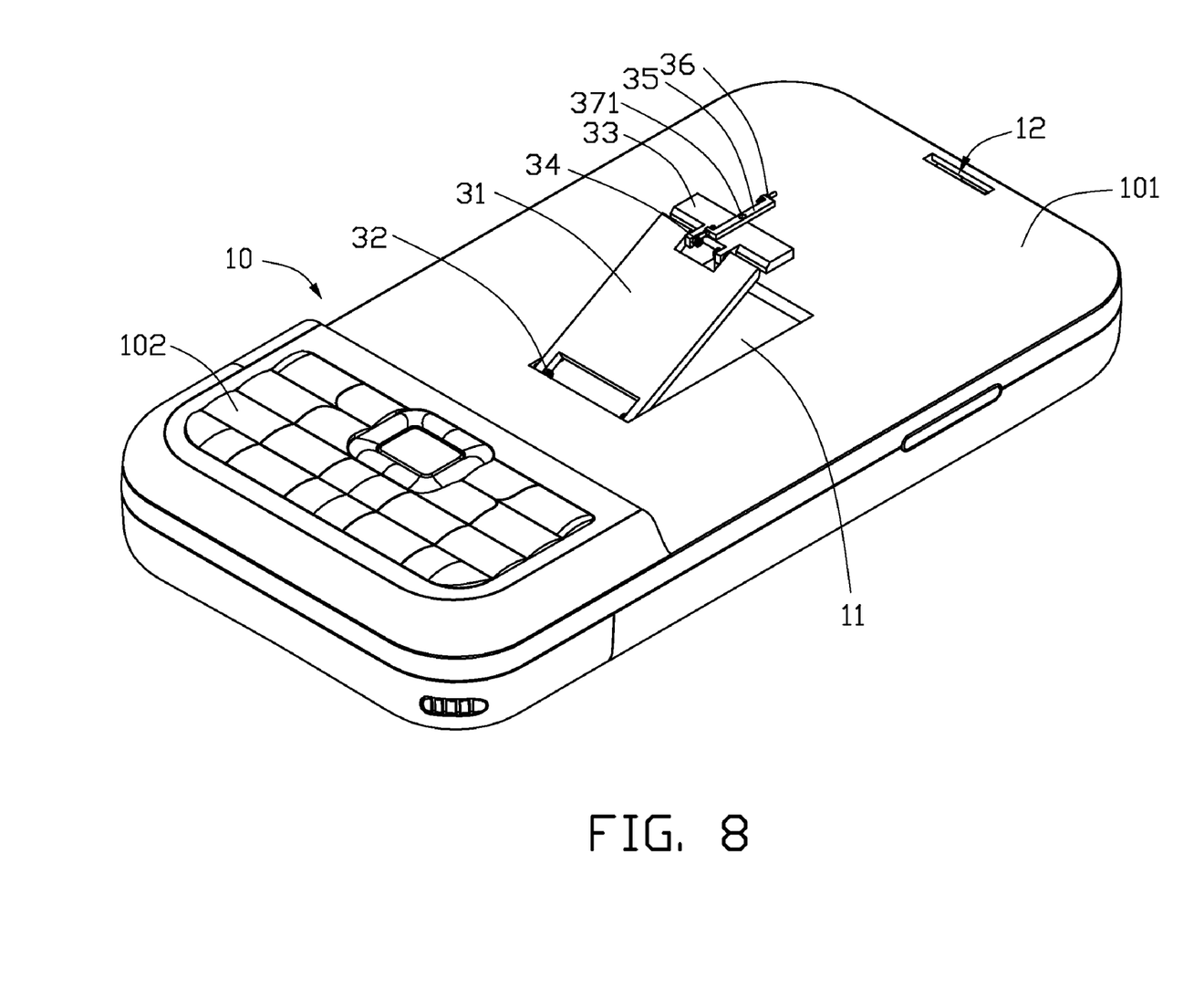
Figure 9:
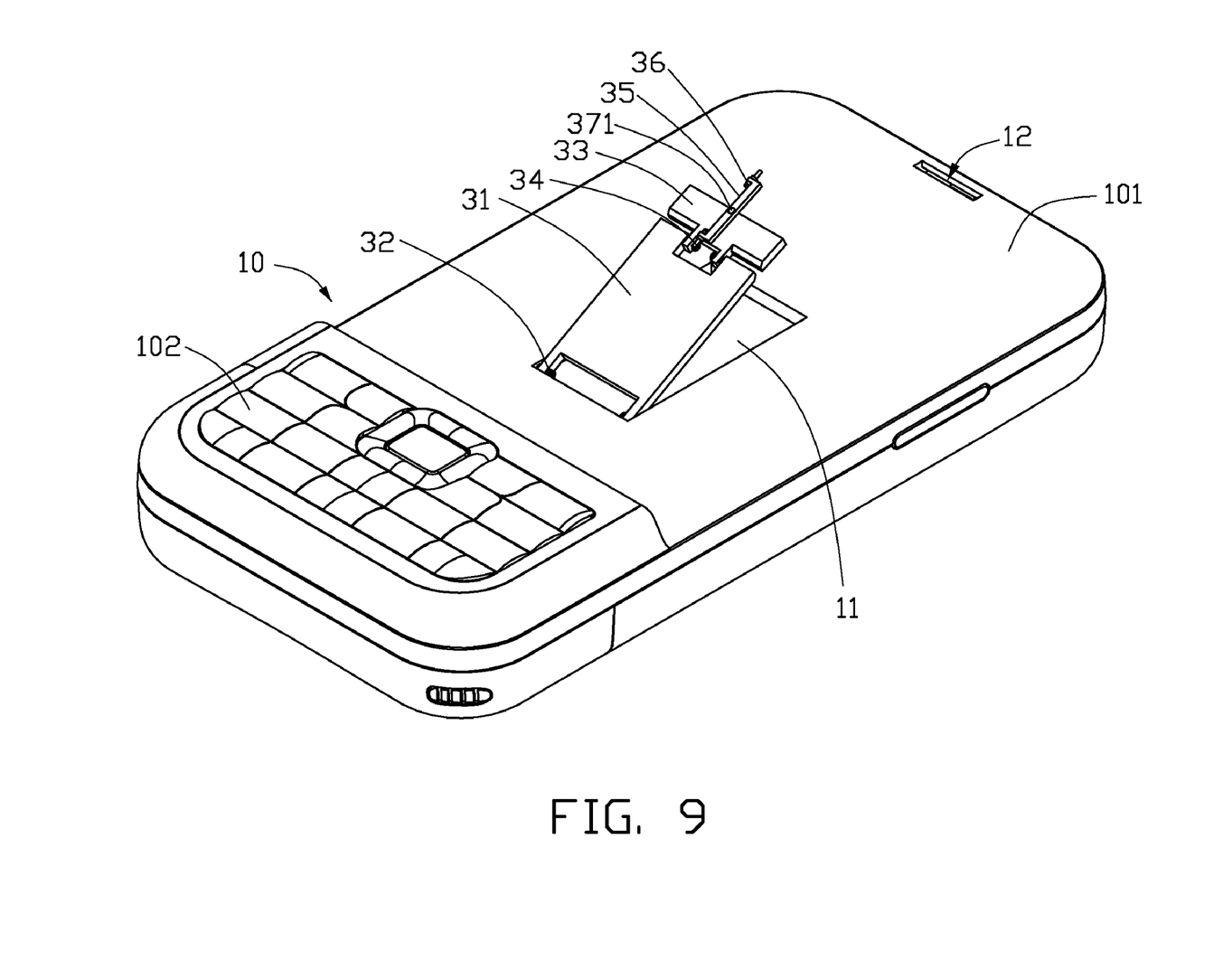
Figure 10:
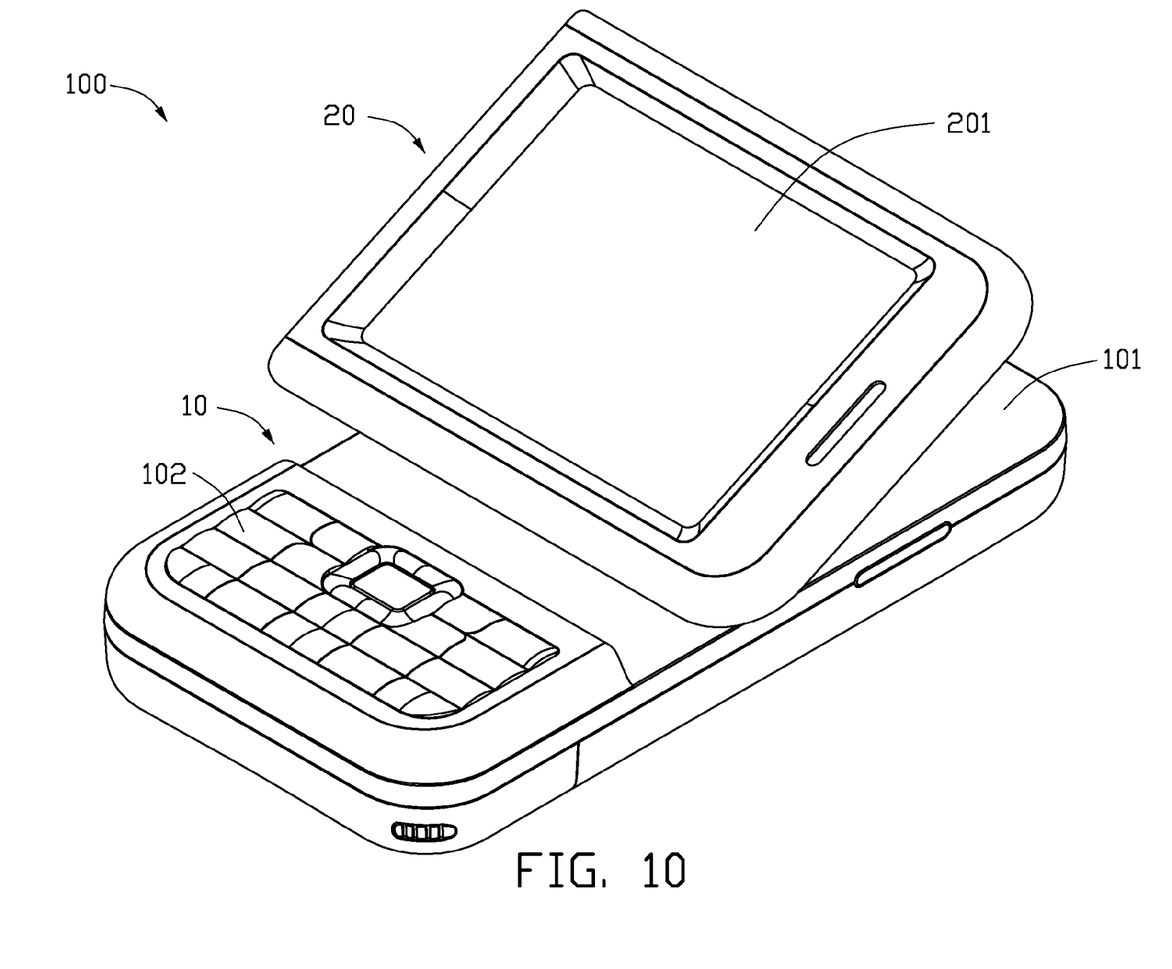
FIG. 10 is a state view of the rotating mechanism supporting the display of FIG. 1.

Referring to FIGS. 4 to 6, when the rotating mechanism 30 is assembled, the primary plate 31, the subsidiary plate 33 and the connecting plate 35 are connected together. Firstly, the first hinge assemblies 32 are mounted to the arms portions 311. The washer 322 is tightly placed around the rod 321, and abuts the head portion 3211. Then, the rod portion 3210 passes through the rod hole 3110, and the washer 323 are tightly placed around the rod portion 3210 for assembling first hinge assembly 32 to the primary plate 31. The extending portions 333 of the subsidiary plate 33 are positioned between the knuckle portions 312. The shaft hole 3120 is aligned with the connecting hole 3331. The two second hinge assemblies 34 are connected to the knuckle portions 312 and the extending portions 333. Specifically, the washer 342 is placed around the rod portion 3410, and the rod portion 3410 is inserted into the connecting hole 3331, the washer 343, and the shaft hole 3120. After that, the connecting plate 35 is assembled to the subsidiary plate 33. The pin portion 3710 passes through the stepped hole 3510, the washer 372, and is connected to the notch 3302. The washer 352 is sandwiched between the connecting plate 35 and the subsidiary plate 33. The third assemblies 36 are assembled to the connecting plate 35. The assembling process is similar to that of the first hinge assembly 32, and therefore is not detailed. The assembled rotating mechanism 30 is mounted to the housing body 10. The rod 321 is connected to the pin hole 112 of the housing body 10 for rotatably connected the primary plate 31 to the housing body 10. The connecting plate 35 is received in the recess 210 of the display 20. One end of the rods 361 are fixedly connected to the latching holes 211 for connecting the connecting plate 35 to the display 30. The hook 22 is received in the slot 121, the block 123 is slid in the latching hole 122 to latch the hook 22. Thus the display 30 is assembled to the housing body 10.

Referring to FIGS. 7-10, when the user wants to open the display 20 of the mobile phone 100, the block 123 is pushed to slide to separate from the hook 22 so as to unlocked the display 20. The display 20 is manually rotated relative to the housing body 10 along the first hinge assemblies 32. The connecting plate 35 brings the subsidiary plate 33 and the primary plate 31 away from the cavity 11 until the display 30 can be adjusted to a state parallel to the housing body 10. At that time, the primary plate 31 is tilted relative to the housing body 10, and the subsidiary plate 33 with the connecting plate 33 is parallel to the housing body 10. The washers 322, 323 provide friction between the housing body 10 and the arm portions 311 for allowing the primary plate 31 to be held at a desired angle relative to the housing body 10. The washers 342, 343 are positioned between the primary plate 31 and the subsidiary plate 33 for allowing the subsidiary plate 33 to be held at a desired angle relative to the primary plate 31.

Then, the display 20 with the connecting plate 35 can be rotated 90 degrees along the pin 371 relative to the subsidiary plate 33. After that, the subsidiary plate 33 is rotated to a co-planner state with the primary plate 31 along the second hinge assemblies 34. Thus, the subsidiary plate 33 and the primary plate 31 together support the display 20 to keep the display at a tilted state.

The rotating mechanism 30 allows the display 20 to be rotated a suitable angle such as a 90 degree. The screen 201 of the display 20 may have a wide area to show the information.

It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A rotating mechanism for a portable electronic device including a housing body and a display, the rotating mechanism comprising:

a primary plate pivotally connected to the housing body, the primary plate forming two knuckle portions;

a subsidiary plate pivotally connected the primary plate, the subsidiary plate forming two extending portions and defining a notch opposite to the extending portions;

two second hinge assemblies; the second hinge assemblies connecting the subsidiary plate to the primary plate; and a connecting plate positioned on the subsidiary plate, and rotating around an axis perpendicular to the subsidiary plate, the connecting plate defining a stepped hole in a middle area thereof, a pin rotatably connected to the stepped hole and the notch, and perpendicular to the subsidiary plate and the connecting plate, the connecting plate fixed to the display allowing the display to hold a variety of positions relative to the housing body.

2. The rotating mechanism as claimed in claim 1, further comprising two first hinge assemblies, wherein the housing body defines a cavity with two side walls, each side wall defines a pin hole, the primary plate forms two arm portions at one end thereof, each arm portion defines a rod hole, each first hinge assembly received in the pin hole and the rod hole for rotatably connecting the primary plate to the main body, and the primary plate and the subsidiary plate are completely received in the cavity at a first state.

3. The rotating mechanism as claimed in claim 2, wherein each first hinge assembly includes a rod and a plurality of washers, the washers provide friction between the housing body and the primary plate.

4. The rotating mechanism as claimed in claim 1, further comprising two third hinge assemblies, wherein the connecting plate forms two pivotal portions, each pivotal portion defines a pivotal hole, the display defines a recess with two end walls, the connecting plate is received in the recess, each end wall defines a latching hole, the third hinge assemblies are fixedly connected the pivotal hole and the latching hole.

5. A portable communication device comprising:
a housing body defining a cavity;
a display defining a recess;
a rotating mechanism comprising:
a primary plate pivotally connected to the cavity;
a subsidiary plate pivotally connected the primary plate, the subsidiary plate forming two extending portions and defining a notch opposite to the extending portions; and
a connecting plate positioned on the subsidiary plate, and rotating around an axis perpendicular to the subsidiary plate, the connecting plate defining a stepped hole in a middle area thereof, a pin rotatably connected to the stepped hole and the notch, and is perpendicular to the subsidiary plate and the connecting plate, the connecting plate received in the recess allowing the display to hold a variety of positions relative to the housing body.

6. The portable communication device as claimed in claim 5, further comprising two first hinge assemblies, wherein the cavity includes two side walls, each side wall defines a pin hole, the primary plate forms two arm portions at one end thereof, each arm portion defines a rod hole, each first hinge assembly received in the pin hole and the rod hole for rotatably connecting the primary plate to the main body.

7. The portable communication device as claimed in claim 6, wherein each first hinge assembly includes a rod and a plurality of washers, the washers provide friction between the housing body and the primary plate.

8. The portable communication device as claimed in claim 5, further comprising two second hinge assemblies, wherein the primary plate forms two knuckle portions, the second hinge assemblies connect the subsidiary plate to the primary plate.

9. The portable communication device as claimed in claim 5, wherein further comprising two third hinge assemblies, wherein the connecting plate forms two pivotal portions, each pivotal portion defines a pivotal hole, the recess includes two end walls, each end wall defines a latching hole, the third hinge assemblies are fixedly connected the pivotal hole and the latching hole.

10. A portable communication device comprising:

a housing body defining a cavity including two side walls, each side wall defining a pin hole;

a display defining a recess including two end walls, each end wall defining a latching hole;

a rotating mechanism comprising:

two first hinge assemblies;

a primary plate including two arm portions at one end thereof and two knuckle portions at another end thereof, each arm portion defining a rod hole, each first hinge assembly received in the pin hole and the rod hole for rotatably connecting the primary plate to the main body;

two second hinge assemblies;

a subsidiary plate including two extending portions and a notch opposite to the extending portions, the second hinge assemblies connecting the knuckle portions to the extending portions; and two third hinge assemblies;

a connecting plate positioned on the subsidiary plate, and rotating around an axis perpendicular to the subsidiary plate, the connecting plate defining a stepped hole in a middle area thereof, a pin rotatably connected to the stepped hole and the notch, and perpendicular to the subsidiary plate and the connecting plate, the connecting plate including two pivotal portions, each pivotal portion defining a pivotal hole, the third hinge assemblies fixedly connected the pivotal hole and the latching hole, the connecting plate received in the recess allowing the display to hold a variety of positions relative to the housing body.

* * * * *